US012073700B2

(12) United States Patent
Birnkrant et al.

(10) Patent No.: US 12,073,700 B2
(45) Date of Patent: Aug. 27, 2024

(54) CHAMBERED HIGH SENSITIVITY FIBER OPTIC SMOKE DETECTION

(71) Applicant: Carrier Corporation, Palm Beach Gardens, FL (US)

(72) Inventors: Michael J. Birnkrant, Wethersfield, CT (US); Jennifer M. Alexander, Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 657 days.

(21) Appl. No.: 17/058,491

(22) PCT Filed: Jul. 2, 2019

(86) PCT No.: PCT/US2019/040319
§ 371 (c)(1),
(2) Date: Nov. 24, 2020

(87) PCT Pub. No.: WO2020/014043
PCT Pub. Date: Jan. 16, 2020

(65) Prior Publication Data
US 2021/0201645 A1    Jul. 1, 2021

Related U.S. Application Data

(60) Provisional application No. 62/697,602, filed on Jul. 13, 2018.

(51) Int. Cl.
*G08B 17/107*    (2006.01)
*G01N 21/53*    (2006.01)
(Continued)

(52) U.S. Cl.
CPC .......... *G08B 17/107* (2013.01); *G01N 21/53* (2013.01); *G08B 13/187* (2013.01); *G08B 25/04* (2013.01);
(Continued)

(58) Field of Classification Search
CPC .... G08B 17/107; G08B 13/187; G08B 25/04; G08B 26/006; G08B 17/103; G01N 21/53; G01N 2201/084; G02B 6/0008
See application file for complete search history.

(56) References Cited

U.S. PATENT DOCUMENTS 3,805,066 A    4/1974    Chijuma et al.
4,642,471 A *  2/1987    Guttinger ............... G08B 29/18
                                                       250/564
(Continued)

FOREIGN PATENT DOCUMENTS

CN    102521942 A    6/2012
CN    203118155 U    8/2013
(Continued)

OTHER PUBLICATIONS

International Search Report of the International Searching Authority; International Application No. PCT/US2019/040319; International Filing Date: Jul. 2, 2019; Date of Mailing: Oct. 16, 2019; 5 pages.
(Continued)

*Primary Examiner* — Brian Wilson
(74) *Attorney, Agent, or Firm* — CANTOR COLBURN LLP

(57) ABSTRACT

A detection system for measuring one or more conditions within a predetermined area includes at least one fiber optic cable for transmitting light to and receiving scattered light from one or more nodes and a cover plate having an internal cavity. The cover plate surrounds the one or more nodes such that the one or more nodes are in communication with the internal cavity. A control system is operably coupled to the at least one fiber optic cable so that the scattered light received by the one or more nodes is transmitted to the
(Continued)

control system. The control system analyzes the scattered light to evaluate a condition at the one or more nodes.

16 Claims, 14 Drawing Sheets

(51) Int. Cl.
- *G08B 13/187* (2006.01)
- *G08B 25/04* (2006.01)
- *G08B 26/00* (2006.01)

(52) U.S. Cl.
CPC ..... *G08B 26/006* (2013.01); *G01N 2201/084* (2013.01)

(56) References Cited

U.S. PATENT DOCUMENTS

| | | | | |
|---|---|---|---|---|
| 4,728,801 | A * | 3/1988 | O'Connor | G08B 29/043 340/630 |
| 4,839,527 | A * | 6/1989 | Leitch | G08B 17/103 340/630 |
| 7,301,641 | B1 | 11/2007 | Overby et al. | |
| 7,591,322 | B2 | 9/2009 | Olson et al. | |
| 8,035,527 | B2 | 10/2011 | Powell | |
| 8,907,802 | B2 | 12/2014 | Erdtmann | |
| 2013/0322490 | A1 | 12/2013 | Bell et al. | |
| 2017/0334574 | A1 | 11/2017 | Wilson et al. | |
| 2017/0370835 | A1 | 12/2017 | Di Marco et al. | |
| 2019/0005793 | A1 * | 1/2019 | Stibich | G08B 17/113 |
| 2020/0134999 | A1 * | 4/2020 | Shimadzu | G08B 17/113 |

FOREIGN PATENT DOCUMENTS

| | | | | |
|---|---|---|---|---|
| CN | 105354971 | B | 8/2017 | |
| CN | 105448028 | B | 12/2017 | |
| DE | 102013213721 | A1 * | 5/2014 | ............ G08B 17/10 |
| DE | 102013002859 | A1 | 8/2014 | |
| EP | 2463837 | A1 | 6/2012 | |
| GB | 2217008 | A | 10/1989 | |
| WO | 2014135341 | A1 | 9/2014 | |
| WO | 2018089473 | A1 | 5/2018 | |

OTHER PUBLICATIONS

Written Opinion of the International Searching Authority; International Application No. PCT/US2019/040319; International Filing Date: Jul. 2, 2019; Date of Mailing: Oct. 16, 2019; 8 pages.

European Office Action; European Application No. 197454101; dated Mar. 31, 2023; 6 pages.

* cited by examiner

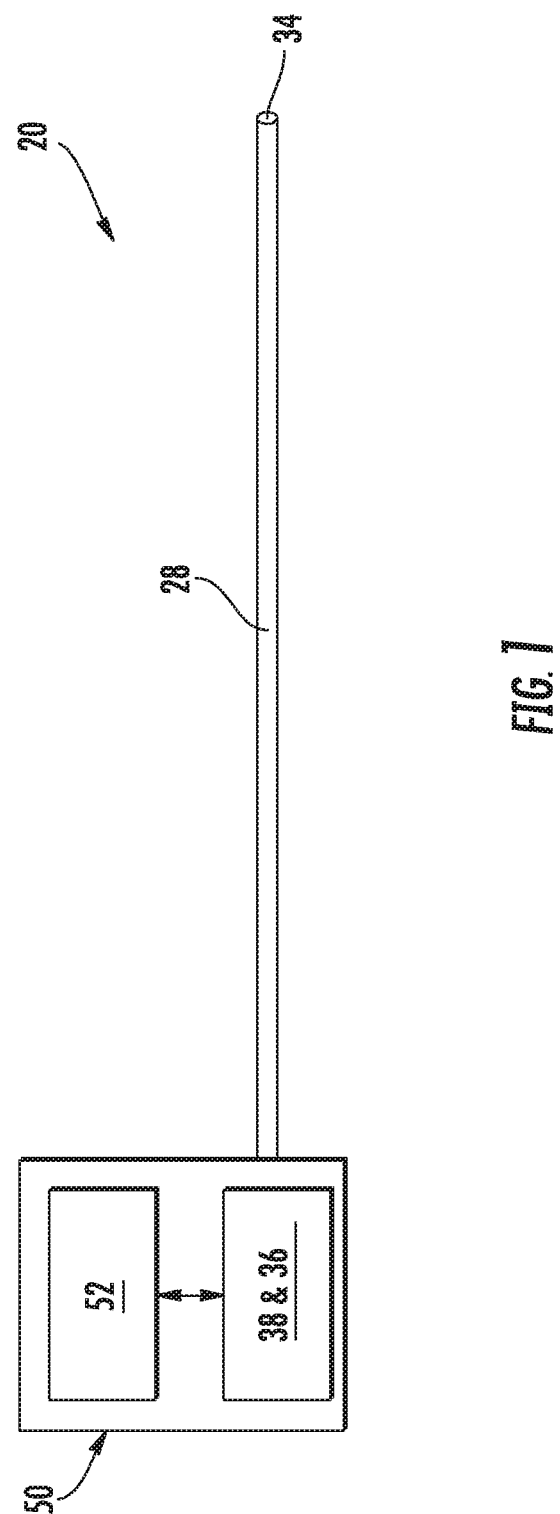

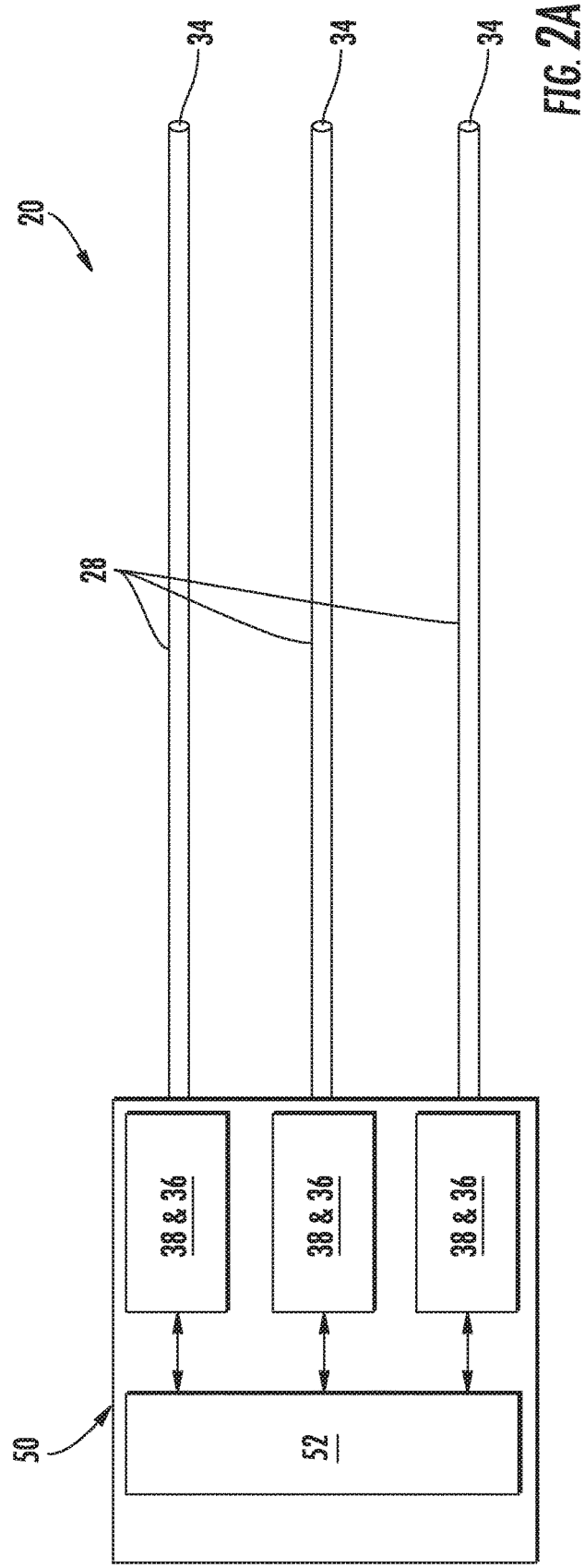
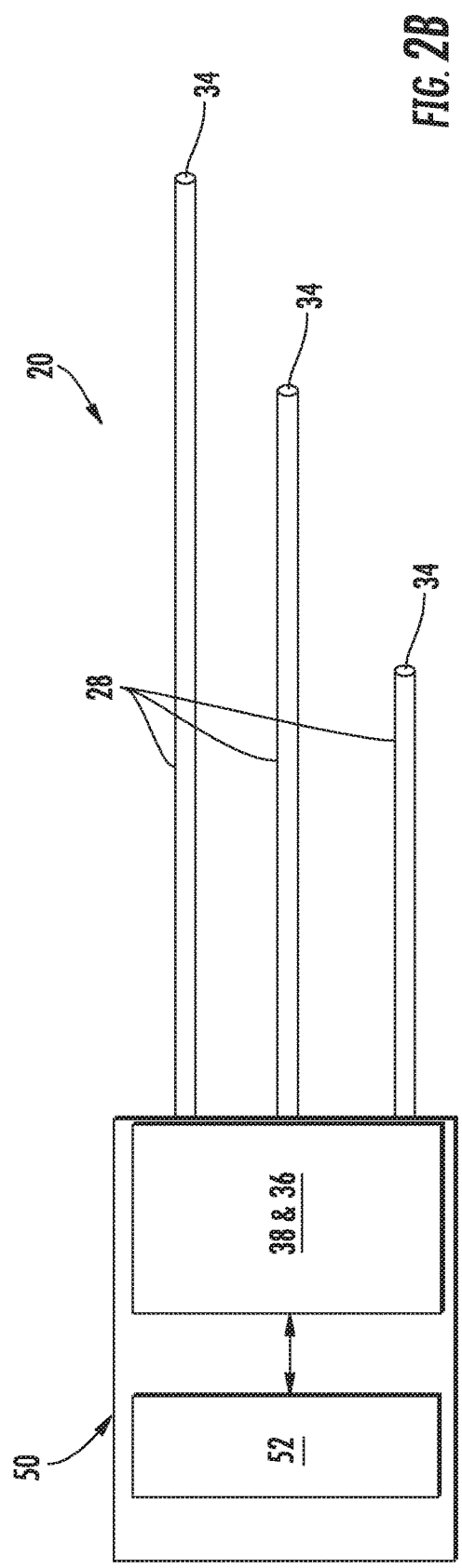

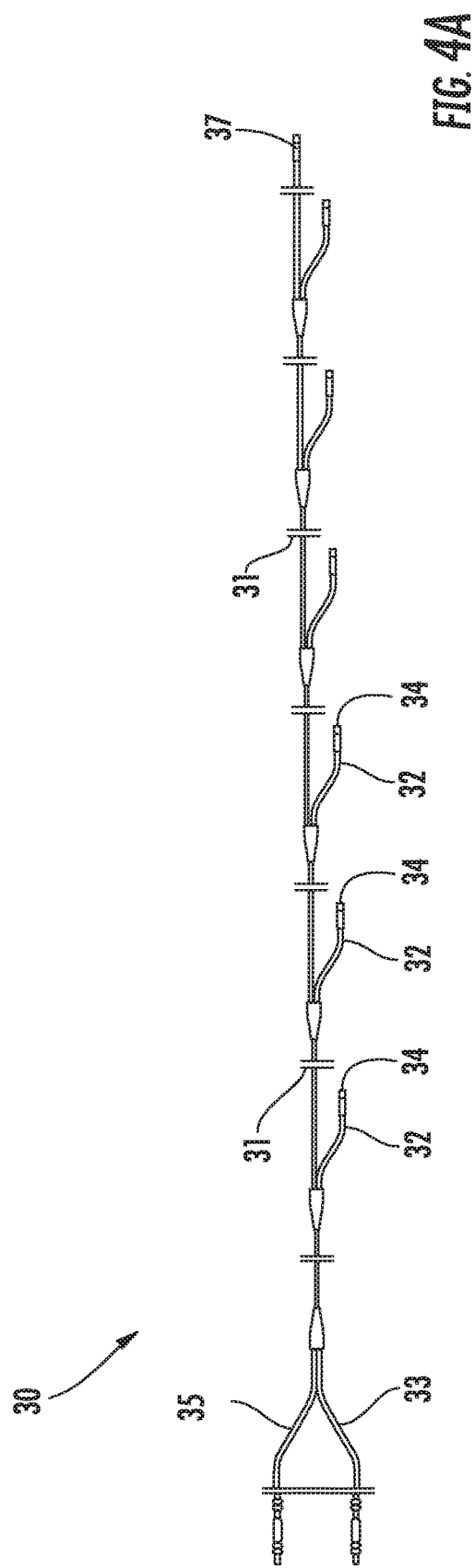
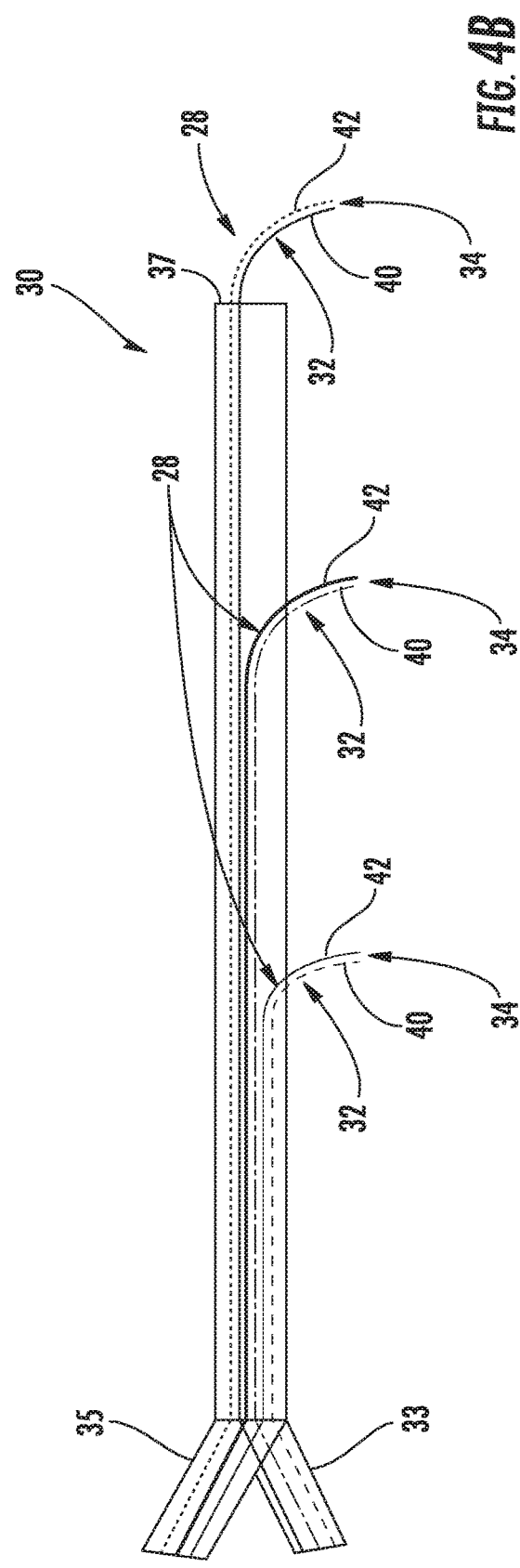

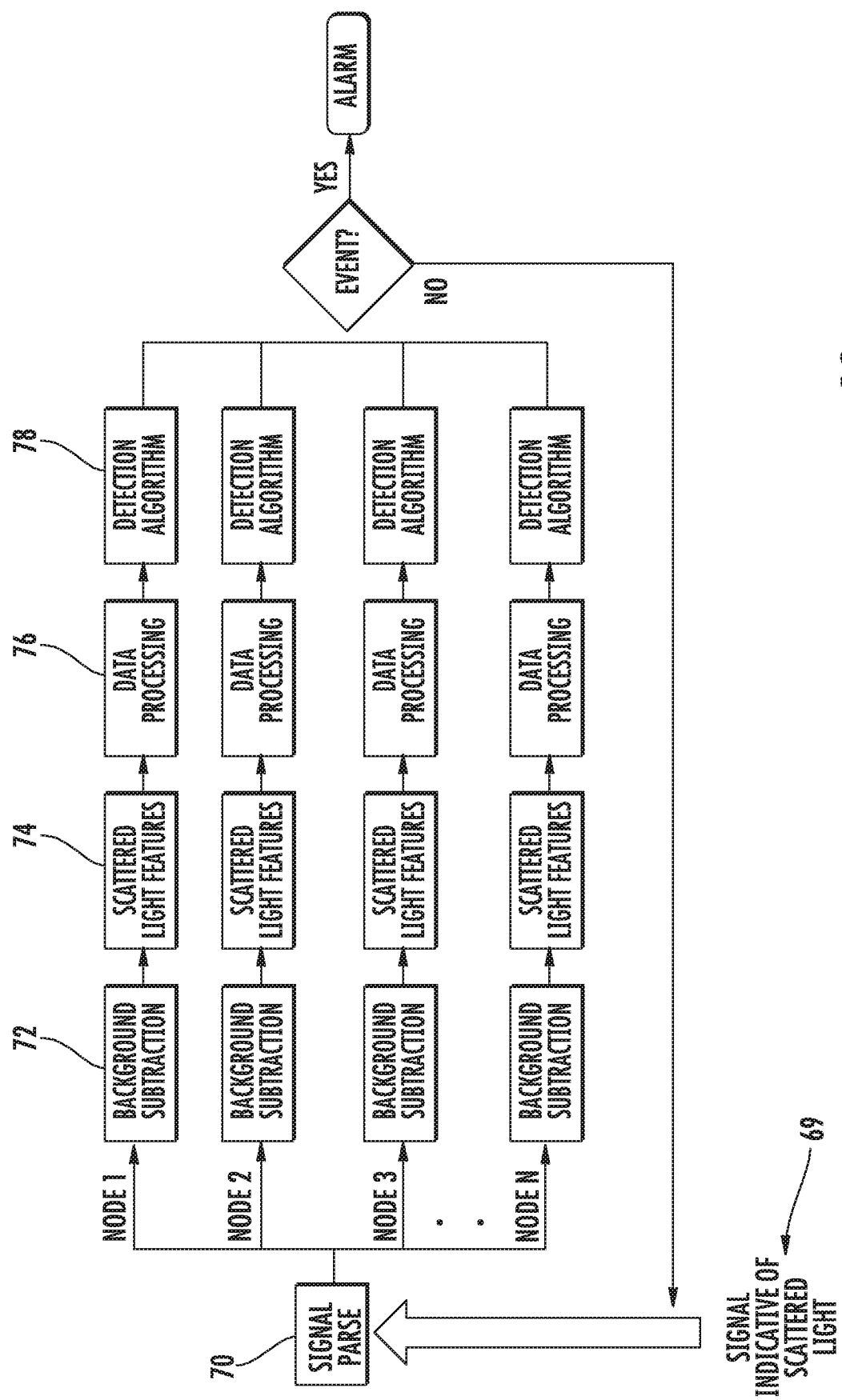

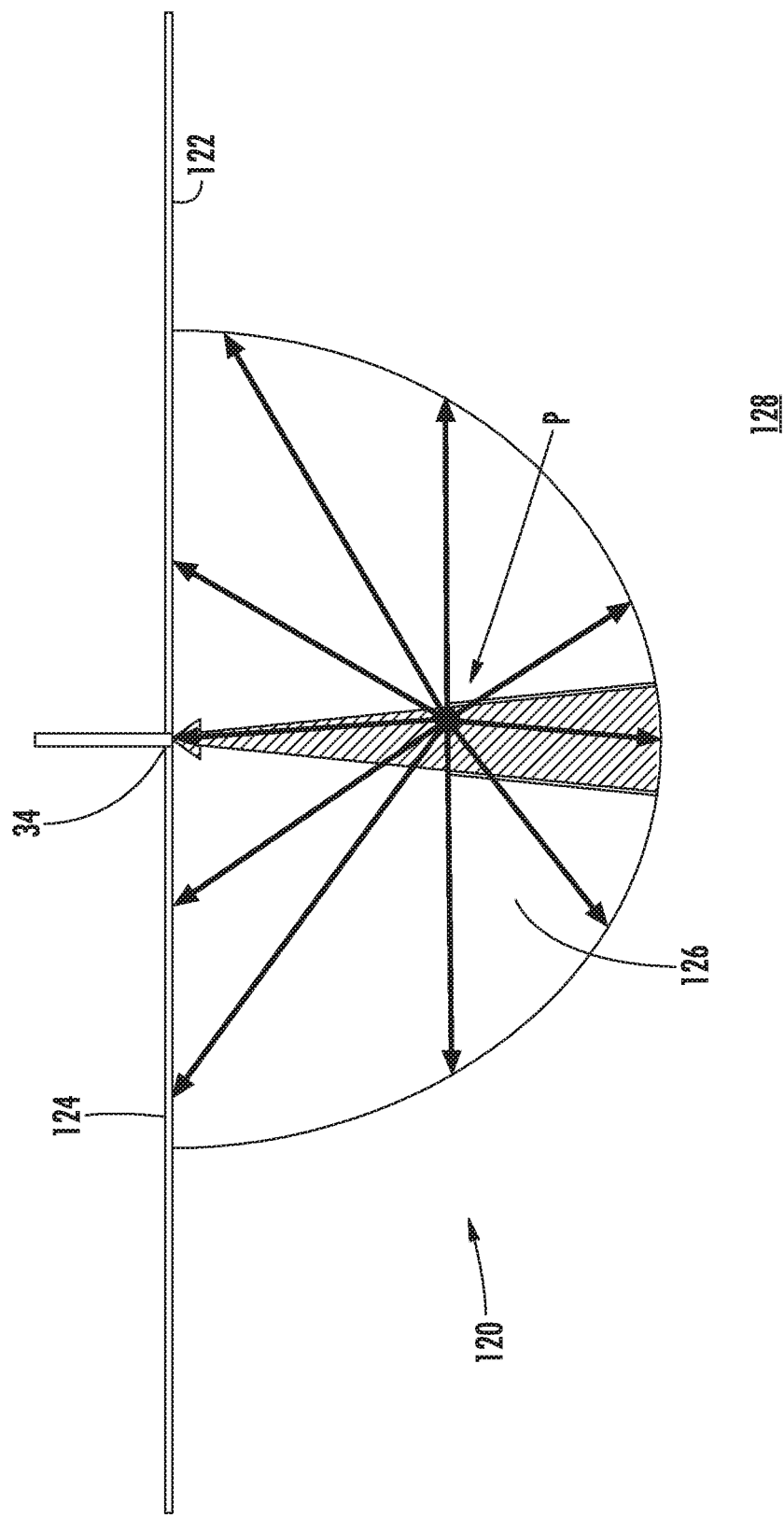

CHAMBERED HIGH SENSITIVITY FIBER OPTIC SMOKE DETECTION

CROSS REFERENCE TO RELATED APPLICATIONS

This application is a National Stage application of PCT/US2019/040319 filed Jul. 2, 2019, which claims priority to U.S. Provisional application 62/697,602 filed Jul. 13, 2018, both of which are incorporated by reference in their entirety herein.

BACKGROUND

Embodiments of this disclosure relate generally to a system for detecting conditions within a predetermined space and, more particularly, to a fiber optic detection system.

Conventional smoke detection systems operate by detecting the presence of smoke or other airborne pollutants. Upon detection of a threshold level of particles, an alarm or other signal, such as a notification signal, may be activated and operation of a fire suppression system may be initiated.

High sensitivity smoke detection systems may incorporate a pipe network consisting of one or more pipes with holes or inlets installed at positions where smoke or pre-fire emissions may be collected from a region or environment being monitored. Air is drawn into the pipe network through the inlets, such as via a fan, and is subsequently directed to a detector. In some conventional smoke detection systems, individual sensor units may be positioned at each sensing location, and each sensor unit has its own processing and sensing components.

Delays in the detecting the presence of the fire may occur in conventional point smoke detectors and also pipe network detection systems, for example due to the smoke transport time. In pipe network detection systems, due to the size of the pipe network, there is a typically a time delay between when the smoke enters the pipe network through an inlet and when that smoke actually reaches the remote detector. In addition, because smoke or other pollutants initially enter the pipe network through a few of the inlets, the smoke mixes with the clean air provided to the pipe from the remainder of the inlets. As a result of this dilution, the smoke detectable from the smoke and air mixture may not exceed the threshold necessary to indicate the existence of a fire.

SUMMARY

According to an embodiment, a detection system for measuring one or more conditions within a predetermined area includes at least one fiber optic cable for transmitting light to and receiving scattered light from one or more nodes and a cover plate having an internal cavity. The cover plate surrounds the one or more nodes such that the one or more nodes are in communication with the internal cavity. A control system is operably coupled to the at least one fiber optic cable so that the scattered light received by the one or more nodes is transmitted to the control system. The control system analyzes the scattered light to evaluate a condition at the one or more nodes.

In addition to one or more of the features described above, or as an alternative, in further embodiments the cover plate is generally concave in shape.

In addition to one or more of the features described above, or as an alternative, in further embodiments the one or more nodes includes a plurality of nodes, and each of the plurality of nodes is surrounded by a cover plate.

In addition to one or more of the features described above, or as an alternative, in further embodiments the one or more nodes includes a plurality of nodes and at least one of the plurality of nodes is not surrounded by a cover plate.

In addition to one or more of the features described above, or as an alternative, in further embodiments a top surface of the cover plate is connected to a mounting surface, the one or more nodes being exposed at the mounting surface.

In addition to one or more of the features described above, or as an alternative, in further embodiments the cover plate is directly attached to the one or more nodes themselves.

In addition to one or more of the features described above, or as an alternative, in further embodiments the cover plate is removably mounted adjacent the one or more nodes.

In addition to one or more of the features described above, or as an alternative, in further embodiments a diameter of the cover plate is greater than the one or more nodes.

In addition to one or more of the features described above, or as an alternative, in further embodiments the cover plate includes a plurality of perforations.

In addition to one or more of the features described above, or as an alternative, in further embodiments the plurality of perforations are sized to allow particles from an atmosphere exterior to the cover plate to transfer into the internal cavity.

In addition to one or more of the features described above, or as an alternative, in further embodiments the plurality of perforations are sized to form a partial barrier between the internal cavity and the atmosphere exterior to the cover plate.

In addition to one or more of the features described above, or as an alternative, in further embodiments the cover plate limits a transmission of ambient light into the internal cavity.

In addition to one or more of the features described above, or as an alternative, in further embodiments the cover plate absorbs one or more wavelengths of light emitted by the node.

In addition to one or more of the features described above, or as an alternative, in further embodiments the cover plate is anti-reflective at one or more wavelengths of light emitted by the node.

In addition to one or more of the features described above, or as an alternative, in further embodiments the cover plate is transparent to one or more wavelengths of light emitted by the node.

In addition to one or more of the features described above, or as an alternative, in further embodiments the cover plate is configured to restrict a transfer of solid objects into the internal cavity.

According to another embodiment, a method of measuring a condition includes transmitting light from a node of a fiber optic cable into an internal cavity defined by a cover plate surrounding the node, scattering the light within the internal cavity, receiving a portion of the scattered light from the internal cavity, communicating the scattered light to a control system, and analyzing the scattered light to evaluate a condition within the internal cavity adjacent the node.

In addition to one or more of the features described above, or as an alternative, in further embodiments comprising absorbing another portion of the scattered light at the cover plate.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is schematic diagram of a detection system according to an embodiment;

FIG. 2A is a schematic diagram of a detection system according to another embodiment;

FIG. 2B is a schematic diagram of a detection system according to another embodiment;

FIG. 4A is a side view of a fiber harness of a detection system according to an embodiment;

FIG. 4B is a schematic diagram of a fiber harness of a detection system according to an embodiment;

FIG. 10 is a schematic diagram of process flow for evaluating the signals generated by the light sensitive device according to an embodiment;

FIG. 12 is side view of a chamber surrounding a node of the detection system according to an embodiment.

Figure 1A:
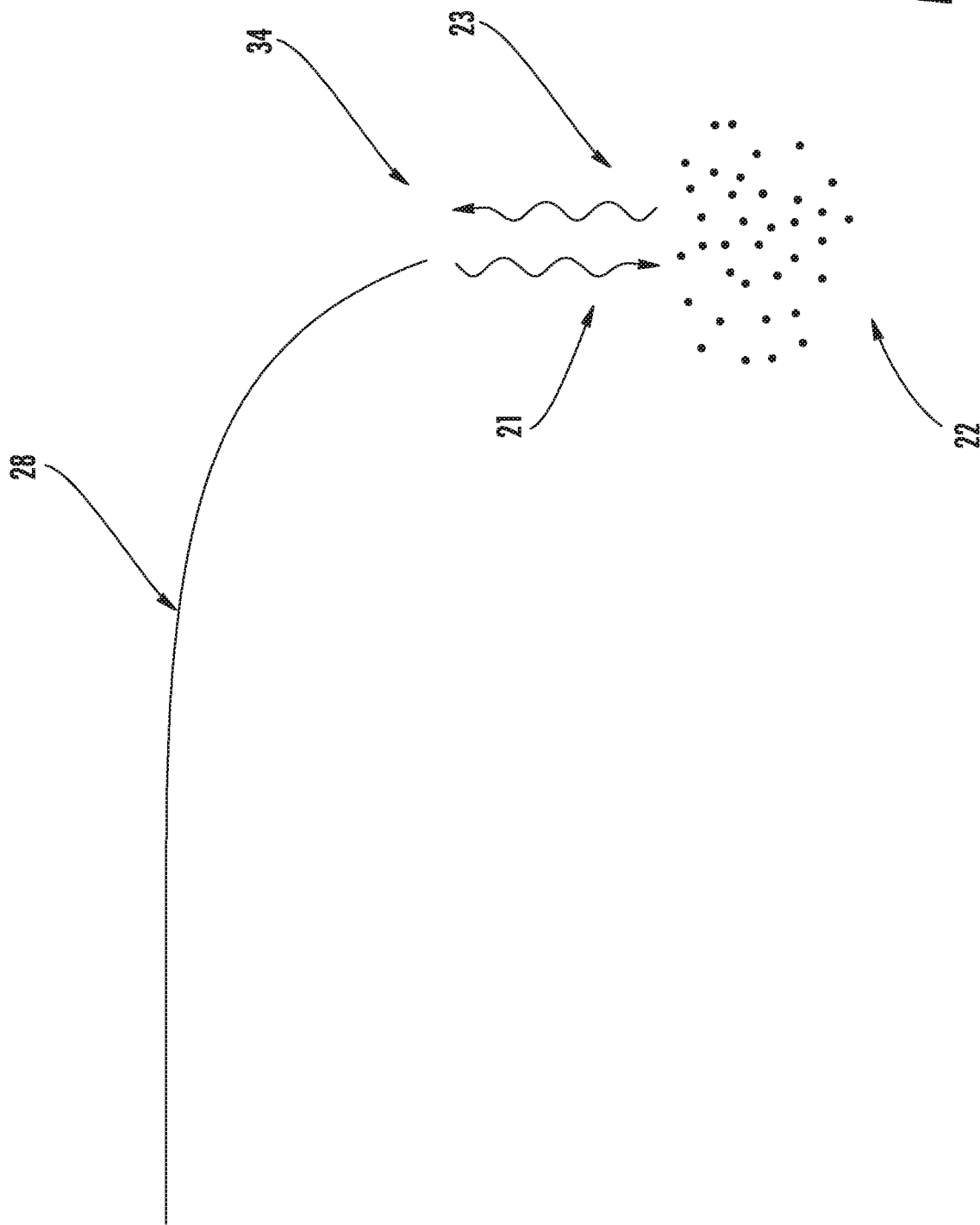
FIG. 1A is a schematic diagram of light transmission at a node of a detection system according to an embodiment.

The detailed description explains embodiments of the present disclosure, together with advantages and features, by way of example with reference to the drawings.

DETAILED DESCRIPTION

Referring now to the FIGS., a system 20 for detecting one or more conditions or events within a designated area is illustrated. The detection system 20 may be able to detect one or more hazardous conditions, including but not limited to the presence of smoke, fire, temperature, flame, or any of a plurality of pollutants, combustion products, or chemicals. Alternatively, or in addition, the detection system 20 may be configured to perform monitoring operations of people, lighting conditions, or objects. In an embodiment, the system 20 may operate in a manner similar to a motion sensor, such as to detect the presence of a person, occupants, or unauthorized access to the designated area for example. The conditions and events described herein are intended as an example only, and other suitable conditions or events are within the scope of the disclosure. By improving the human-machine interface of the detection system 20, such as by mapping the physical location of each of node or detector within the system for example, the operation of each detector may be tracked and adjusted to maximize the operational efficiency of the system 20.

The detection system 20 uses light to evaluate a volume for the presence of a condition. In this specification, the term "light" means coherent or incoherent radiation at any frequency or a combination of frequencies in the electromagnetic spectrum. In an example, the photoelectric system uses light scattering to determine the presence of particles in the ambient atmosphere to indicate the existence of a predetermined condition or event. In this specification, the term "scattered light" may include any change to the amplitude/intensity or direction of the incident light, including reflection, refraction, diffraction, absorption, and scattering in any/all directions. In this example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the incident light, by detecting light scattered by an object for example, can provide information about the designated area including determining the presence of a predetermined condition or event.

Further, in this specification, the term "particles" may include physical objects of any size such as atoms, molecules, structured or unstructured agglomerations of atoms or molecules, and the like. In an example, light is emitted into the designated area; when the light encounters an object (a person, smoke particle, or gas molecule for example), the light can be scattered and/or absorbed due to a difference in the refractive index of the object compared to the surrounding medium (air). Depending on the object, the light can be scattered in all different directions. Observing any changes in the received light, by detecting light scattered by an object for example, can provide information about the designated area including determining the presence of a predetermined condition or event.

In its most basic form, as shown in FIG. 1, the detection system 20 includes a single fiber optic cable 28 with at least one fiber optic core. The term fiber optic cable 28 includes any form of optical fiber. As examples, an optical fiber is a length of cable that is composed of one or more optical fiber cores of single-mode, multimode, polarization maintaining, photonic crystal fiber or hollow core. Each cable may have a length of up to 5000 m. A node 34 is located at the termination point of a fiber optic cable 28 and is inherently included in the definition of a fiber optic cable 28. The node 34 is positioned in communication with the ambient atmosphere. A light source 36, such as a laser diode for example, and a light sensitive device 38, such as a photodiode for example, are coupled to the fiber optic cable 28. A control system 50 of the detection system 20 including a control unit 52, discussed in further detail below, is utilized to manage the detection system operation and may include control of components, data acquisition, data processing and data analysis.

As shown in FIG. 1A, the light from the light source 36 is transmitted through fiber optic cable 28 and through the node 34 to the surrounding area, illustrated schematically at 21. The light 21 interacts with one or more particles indicative of a condition, illustrated schematically at 22, and is reflected or transmitted back to the node 34, illustrated schematically at 23. A comparison of the light provided to the node 34 from the light source 36 and/or changes to the light reflected back to the light sensitive device 38 from the node 34 will indicate whether or not changes in the atmosphere, such as particles 22 for example, are present in the ambient atmosphere adjacent the node 34 that are causing the scattering of the light. The scattered light as described herein is intended to additionally include reflected, transmitted, and absorbed light. Although the detection system 20 is described as using light scattering to determine a condition or event, embodiments where light obscuration, absorption, and fluorescence is used in addition to or in place of light scattering are also within the scope of the disclosure.

In another embodiment, the detection system 20 can include a plurality of nodes 34. For example, as illustrated in FIG. 2A, a plurality of fiber optic cables 28 and corresponding nodes 34 are each associated with a distinct light sensitive device 38. In embodiments where an individual light sensitive device 38 is associated with each node 34, as shown in FIG. 2A, the signal output from each node 34 can be monitored. Upon detection of a predetermined event or condition, it will be possible to localize the position of the event because the position of each node 34 within the system 20 is known. Alternately, as shown in FIG. 2B, a plurality of fiber optic cables 28, may be coupled to a single light source 36 and/or light sensitive device 38.

In embodiments where a single light sensitive device 38 is configured to receive scattered light from a plurality of nodes 34, the control system 50 is able to localize the scattered light, i.e. identify the scattered light received from each of the plurality of nodes 34. For example, the control system 50 may use the position of each node 34, specifically the length of the fiber optic cables 28 associated with each node 34 and the corresponding time of flight (i.e. the time elapsed between when the light was emitted by the light source 36 and when the scattered light was received by the light sensitive device 38), to associate different portions of the light signal with each of the respective nodes 34 that are connected to that light sensitive device 38. Alternatively, or in addition, the time of flight may include the time elapsed between when the light is emitted from the node 34 and when the scattered light is received back at the node 34. In such embodiments, the time of flight provides information regarding the distance of the object or particle relative to the node 34.

Figure 3:
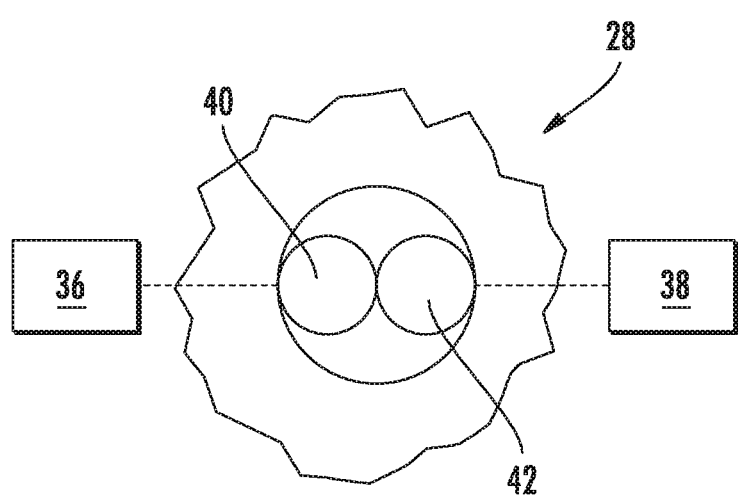
FIG. 3 is a cross-sectional view of a fiber optic node of the fiber harness of FIG. 1 according to an embodiment.

In an embodiment, illustrated in the cross-section of the fiber optic cable shown in FIG. 3, two substantially identical and parallel light transmission fiber cores 40, 42 are included in the fiber optic cable 28 and terminate at the node 34 (not shown in FIG. 3). However, it should be understood that embodiments are also contemplated herein where the fiber optic cable 28 includes only a single fiber core, or more than two cores. In an embodiment, the light source 36 is coupled to the first fiber core 40 and the light sensitive device 38 is coupled to the second fiber core 42, for example near a first end of the fiber optic cable 28. The light source 36 is selectively operable to emit light, which travels down the first fiber core 40 of the fiber optic cable 28 to the node 34. At the node 34, the emitted light is expelled into the adjacent atmosphere. The light is scattered and transmitted back into the node 34 and down the fiber cable 28 to the light sensitive device 38 via the second fiber core 42.

In more complex embodiments, as shown in FIGS. 4A and 4B, rather than having a plurality of individual fiber optic cables 28 separately coupled to the control unit 50, the detection system 20 includes a fiber harness 30. The fiber harness 30 may be formed by bundling a plurality of fiber optic cables 28, or the cores associated with a plurality of fiber optic cables 28, together within a single conduit or sheath for example. However, it should be understood that embodiments where the fiber harness 30 includes only a single fiber optic cable 28 or the cores associated therewith are also contemplated herein.

Structural rigidity is provided to the fiber harness 30 via the inclusion of one or more fiber harness backbones 31. As shown in the FIG., in embodiments where the fiber harness 30 includes a plurality of fiber optic cables 28, the plurality of cables 28 may be bundled together at one or more locations, upstream from the end of each cable 28. The end of each fiber optic cable 28, and therefore the end of each core associated with the cable 28, is separated from the remainder of the fiber optic cables 28 at an adjacent, downstream backbone 31 formed along the length of the fiber harness 30. Each of these free ends defines a fiber optic branch 32 of the fiber harness 30 and has a node 34 associated therewith. For example, as best shown in FIG. 4B, each fiber optic branch 32 includes the free ends of cores 40, 42 that define a node 34 of a corresponding fiber optic cable 28.

In the illustrated, non-limiting embodiments of FIGS. 4A and 4B, the fiber harness 30 additionally includes an emitter leg 33 and a receiver leg 35 associated with each of the plurality of fiber optic branches 32. The emitter leg 33 may contain the first fiber optic cores 40 from each of the plurality of fiber optic branches 32 and the receiver leg 35 may contain all of the second fiber cores 42 from each of the fiber optic branches 32. The length of each pair of fiber optic cores 40, 42 extending between the emitter leg 33 or the receiver leg 35 and a node 34 may vary in length. As a result, each node 34, defined by the cores 40, 42 at the end of each fiber optic branch 32, may be arranged at a distinct location along the fiber harness 30. Accordingly, the position of each of the nodes 34 relative to the fiber harness 30 may be controlled by the length of the cores 40, 42 associated with each node 34. The position of each of the nodes 34 may be set during manufacture, or at the time of installation of the system 20. With this variation in length and therefore position of each node 34, only the longest core or pair of cores 40, 42 is supported at the final backbone 31 located upstream from the end 37 of the harness 30.

Alternatively, the fiber harness 30 may include a fiber optic cable (not shown) having a plurality of branches 32 integrally formed therewith and extending therefrom. The branches 32 may include only a single fiber optic core. The configuration, specifically the spacing of the nodes 34 within a fiber harness 30 may be arranged at locations substantially equidistant from one another. Alternatively, the distance between a first node and a second node may be distinct than the distance between the second node and a third node. In an embodiment, the positioning of each node 34 may correlate to a specific location within the designated area. It is understood that there is no minimum spacing required between adjacent nodes 34.

Figure 5:
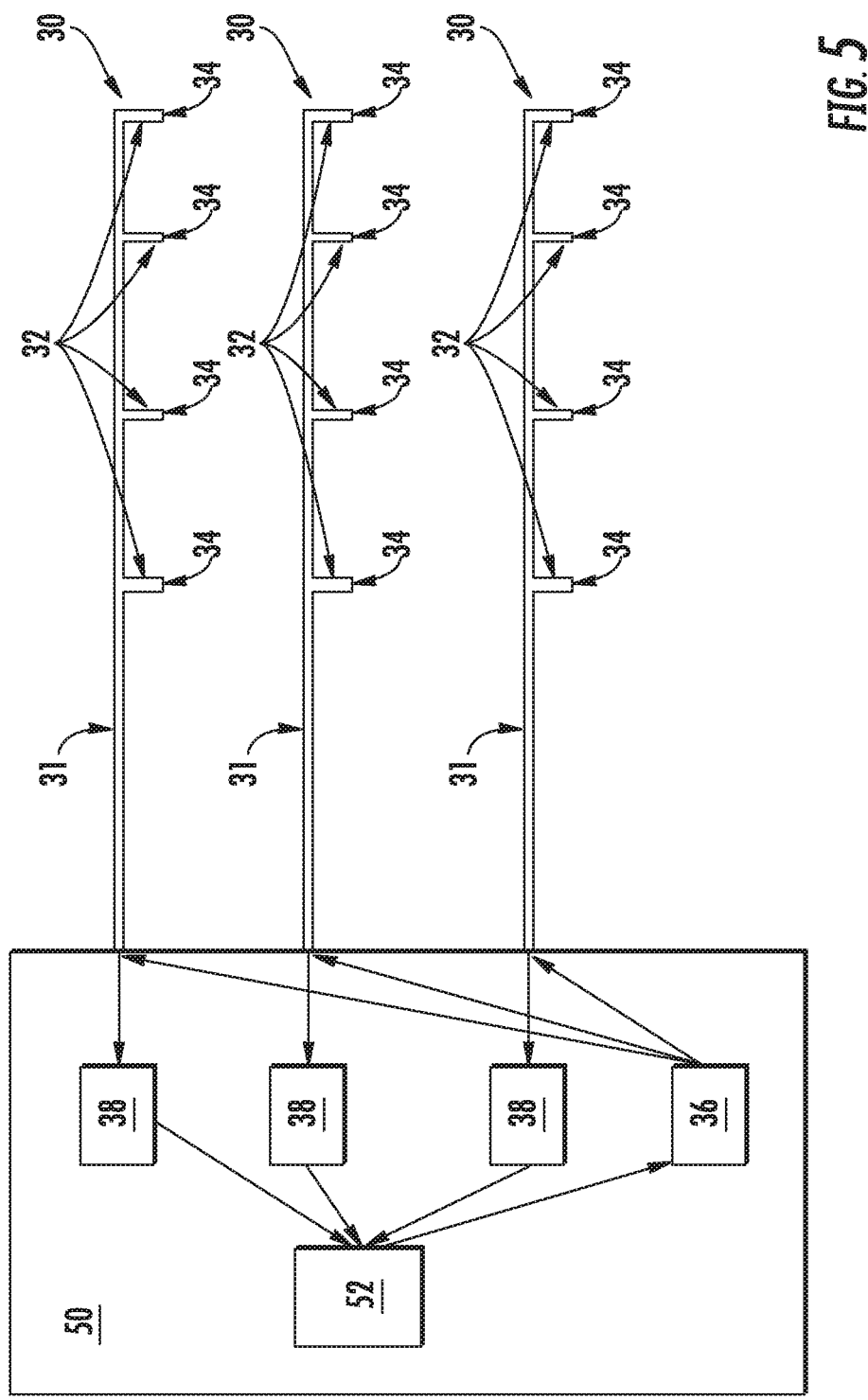
FIG. 5 is a schematic diagram of a detection system including a plurality of fiber harnesses according to an embodiment.

With reference now to FIG. 5, the detection system 20 may additionally include a plurality of fiber harnesses 30. In the illustrated, non-limiting embodiment, a distinct light sensitive device 38 is associated with each of the plurality of fiber harnesses 30, and more specifically with each of the plurality of light transmission cores 42 within the harnesses 30. However, embodiments where a single light sensitive device 38 is coupled to the plurality of fiber harnesses 30 are also contemplated here. In addition, a single light source 36 may be operably coupled to the plurality of light transmission fiber cores 40 within the plurality of fiber harnesses 30 of the system 20. Alternatively, the detection system 20 may include a plurality of light sources 36, each of which is coupled to one or more of the plurality of fiber harnesses 30.

Figure 6:
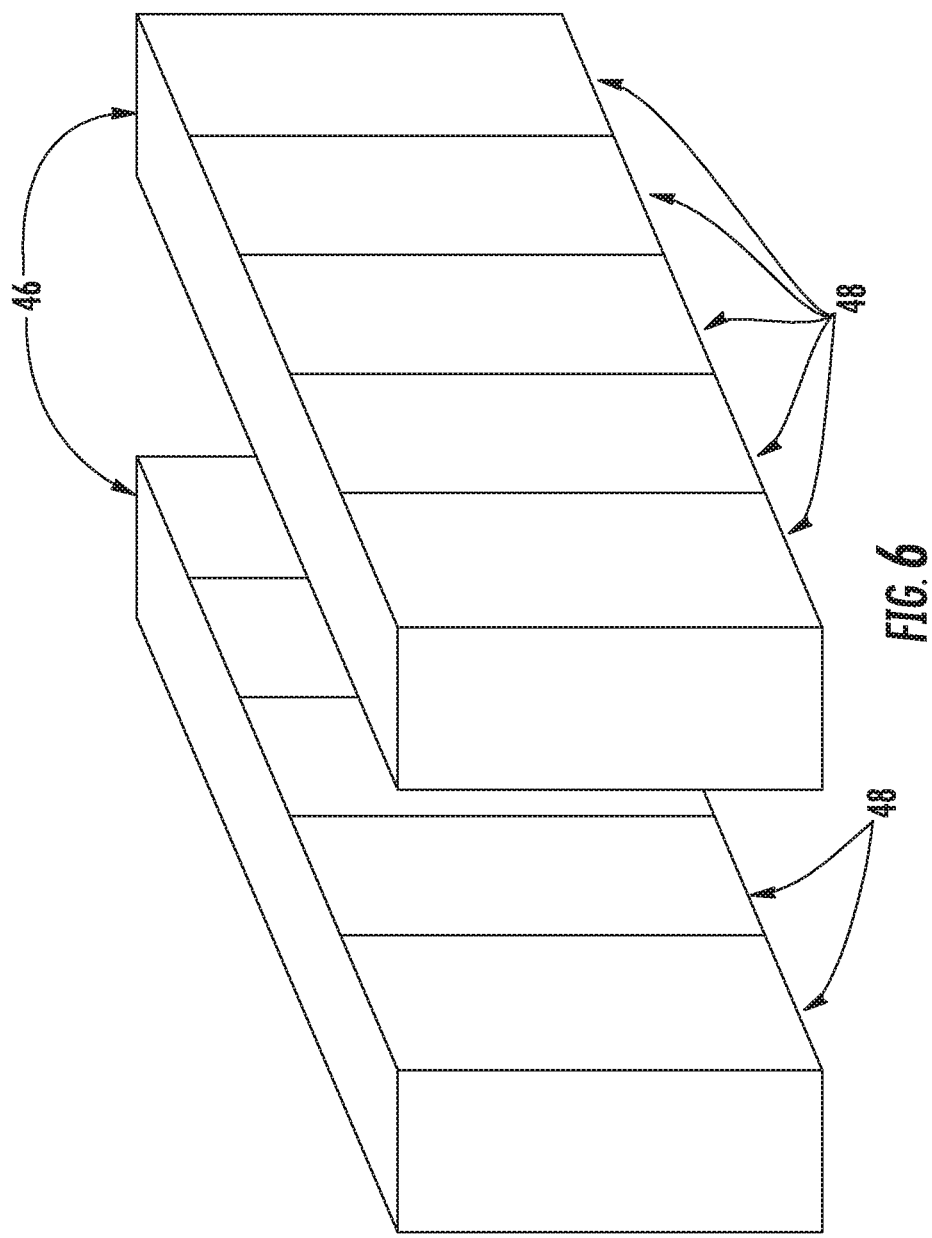
FIG. 6 is a perspective view of an area within a building to be monitored by a detection system according to an embodiment.

The detection system 20 may be configured to monitor a predetermined area, such as a building for example. In an embodiment, the detection system 20 is utilized for predetermined areas having a crowded environment, such as a server room, as shown in FIG. 6. In such embodiments, each fiber harness 30 may be aligned with one or more rows of equipment 46, and each node 34 therein may be located directly adjacent to one of the towers 48 within the rows 46. In addition, the nodes 34 may be arranged so as to monitor specific enclosures, electronic devices, or machinery within the crowded environment. Positioning of the nodes 34 in such a manner allows for earlier detection of a condition as well as localization, which may limit the exposure of the other equipment in the room to the same condition. For example, if a hazardous condition such as overheat, smoke and/or fire were to effect one or more specific pieces of equipment in one or more towers 48, a node 34 physically arranged closest to the tower 48 and/or closest to the equipment may detect the smoke, fire, temperature, and/or flame; Further, since the location of node 34 is known, suppressive or preventative measures may be quickly deployed in the area directly surrounding the node 34, but not in areas where the hazardous condition has not detected. In another application, the detection system 20 may be integrated into an aircraft, such as for monitoring a cargo bay, avionics rack, lavatory, or another confined region of the aircraft that may be susceptible to fires or other events.

Figure 7:
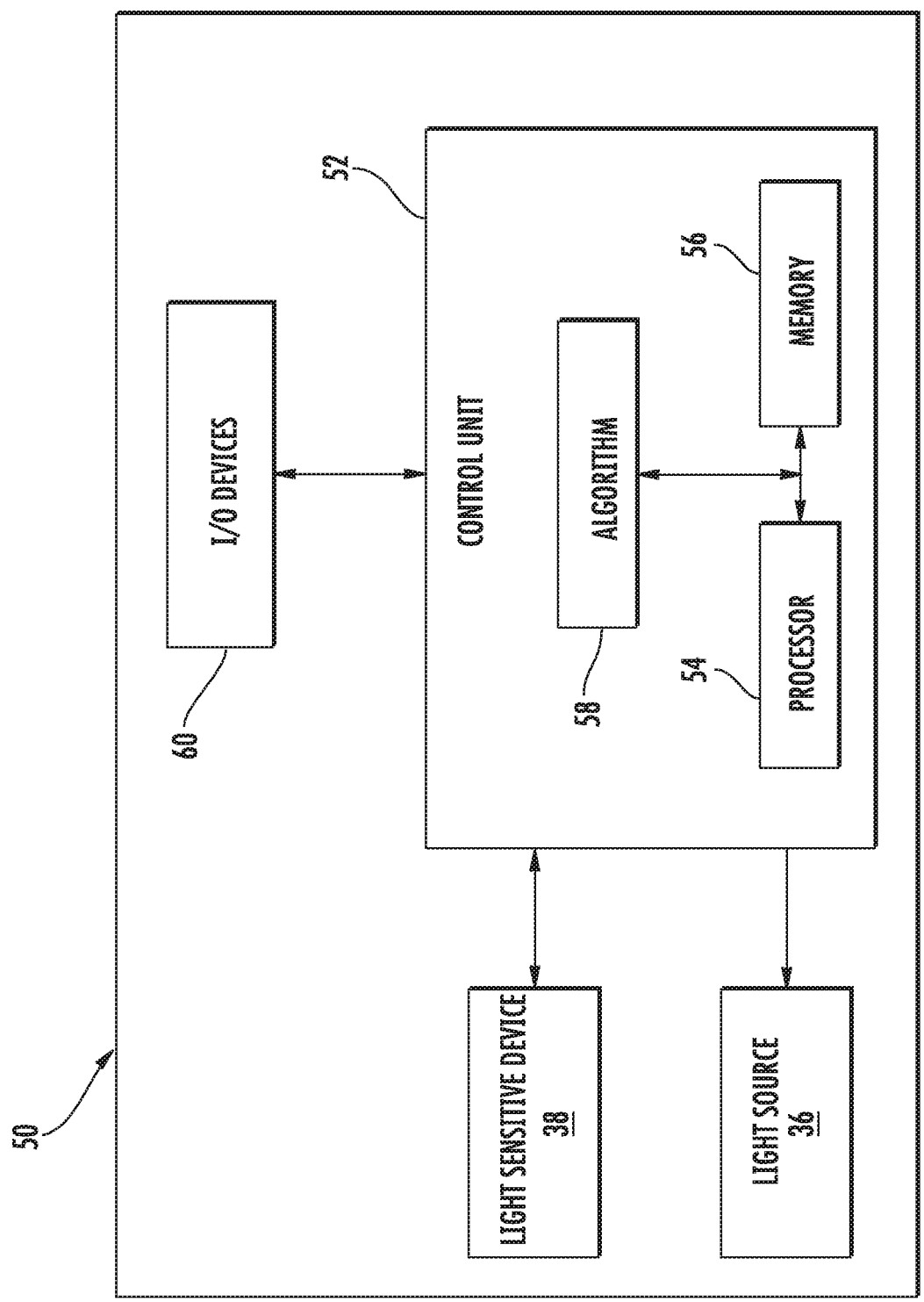
FIG. 7 is a schematic diagram of a control system of the detection system according to an embodiment.

The control system 50 of the detection system 20 is utilized to manage the detection system operation and may include control of components, data acquisition, data processing and data analysis. The control system 50, illustrated in FIG. 7, includes at least one light sensitive device 38, at least one light source, 36, and a control unit 52, such as a computer having one or more processors 54 and memory 56 for implementing one or more algorithms 58 as executable instructions that are executed by the processor 54. The instructions may be stored or organized in any manner at any level of abstraction. The processor 54 may be any type of processor, including a central processing unit ("CPU"), a general purpose processor, a digital signal processor, a microcontroller, an application specific integrated circuit ("ASIC"), a field programmable gate array ("FPGA"), or the like. Also, in some embodiments, memory 56 may include random access memory ("RAM"), read only memory ("ROM"), or other electronic, optical, magnetic, or any other computer readable medium for storing and supporting processing in the memory 56. In addition to being operably coupled to the at least one light source 36 and the at least one light sensitive device 38, the control unit 52 may be associated with one or more input/output devices 60. In an embodiment, the input/output devices 60 may include an alarm or other signal, or a fire suppression system which are activated upon detection of a predefined event or condition. It should be understood herein that the term alarm, as used herein, may indicate any of the possible outcomes of a detection.

The control unit 52, and in some embodiments, the processor 54, may be coupled to the at least one light source 36 and the at least one light sensitive device 38 via connectors. The light sensitive device 38 is configured to convert the scattered light received from a node 34 into a corresponding signal receivable by the processor 54. In an embodiment, the signal generated by the light sensing device 38 is an electronic signal. The signal output from the light sensing device 38 is then provided to the control unit 52 for processing via the processor 54 using an algorithm 58 to determine whether a predefined condition is present.

The signal received by or outputted from the light sensitive device(s) 38 may be amplified and/or filtered, such as by a comparator (not shown), to reduce or eliminate irrelevant information within the signal prior to being communicated to the control unit 52 located remotely from the node 34. In such embodiments, the amplification and filtering of the signal may occur directly within the light sensing device 38, or alternatively, may occur via one or more components disposed between the light sensing device 38 and the control unit 52. The control unit 52 may control the data acquisition of the light sensitive device 38, such as by adjusting the gain of the amplifier, the bandwidth of filters, sampling rates, the amount of timing and data buffering for example.

Figure 8:
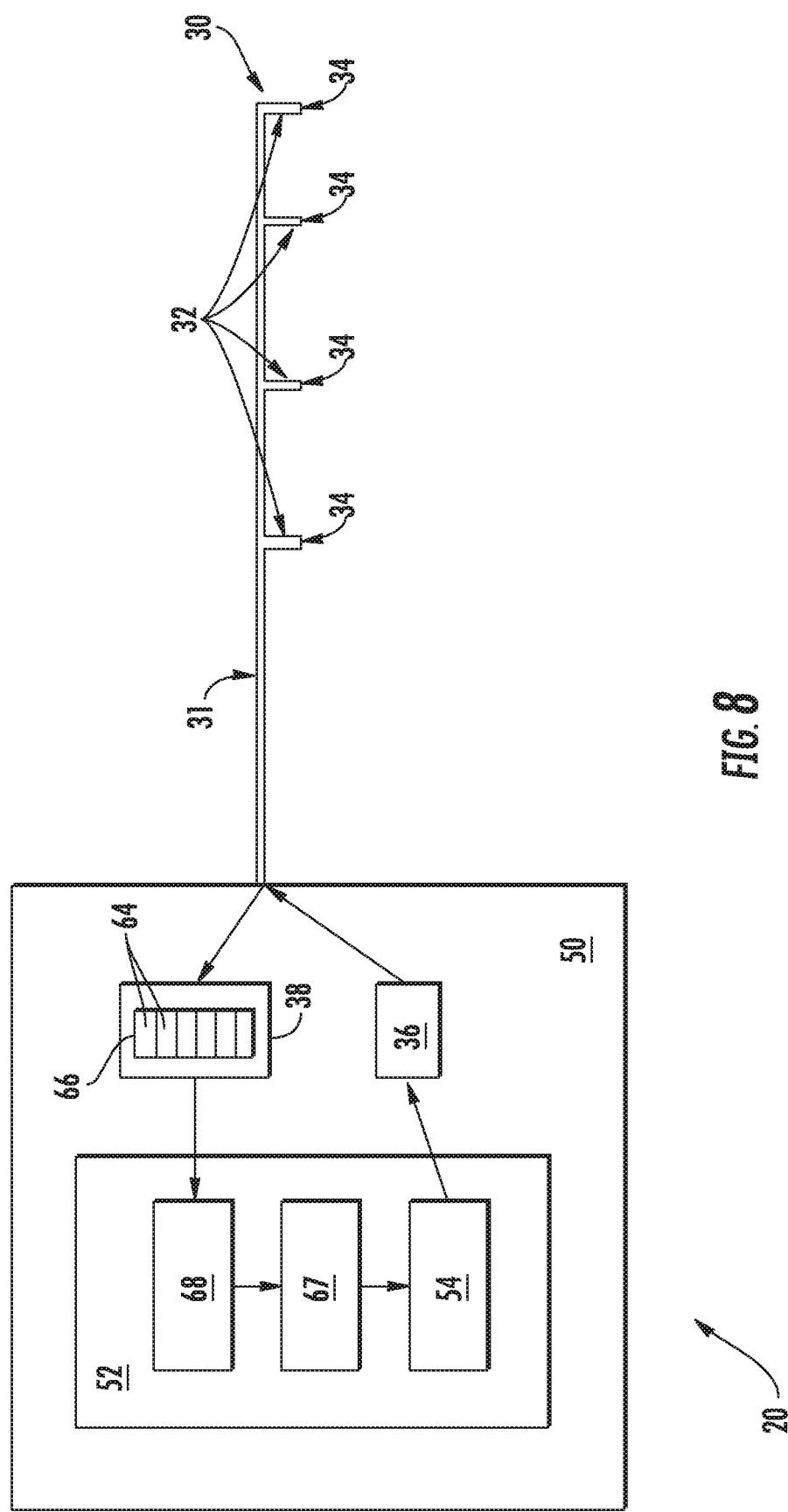
FIG. 8 is another schematic diagram of a detection system including an avalanche photo diode sensor according to an embodiment.

With reference now to FIG. 8, in an embodiment of the system 20, the light sensitive device 38 may include one or more Avalanche Photodiode (APD) sensors 64. For example, an array 66 of APD sensors 64 may be associated with the one or more fiber harnesses 30. In an embodiment, the number of APD sensors 64 within the sensor array 66 is equal to or greater than the total number of fiber harnesses 30 operably coupled thereto. However, embodiments where the total number of APD sensors 64 within the sensor array 66 is less than the total number of fiber harnesses 30 are also contemplated herein.

Data representative of the output from each APD sensor 64 in the APD array 66 is periodically taken by a switch 68, or alternatively, is collected simultaneously. The data acquisition 67 collects the electronic signals from the APD and associates the collected signals with metadata. The metadata as an example can be time, frequency, location or node. In an example, the electronic signals from the APD sensor 64 are synchronized to the laser modulation such that the electrical signals are collected for a period of time that starts when the laser is pulsed to several microseconds after the laser pulse. The data will be collected and processed by the processor 54 to determine whether any of the nodes 34 indicates the existence of a predefined condition or event. In an embodiment, only a portion of the data outputted by the sensor array 66 is collected, for example the data from a first APD sensor 64 associated with a first fiber harness 30. The switch 68 may therefore be configured to collect information from the various APD sensors 64 of the sensor array 66 sequentially. While the data collected from a first APD sensor 64 is being processed to determine if an event or condition has occurred, the data from a second APD 66 of the sensor array 66 is collected and provided to the processor 54 for analysis. When a predefined condition or event has been detected from the data collected from one of the APD sensors 64, the switch 68 may be configured to provide additional information from the same APD sensor 64 to the processor 54 to track the condition or event.

In an embodiment, a single control unit 52 can be configured with up to 16 APDs and the corresponding light sensitive devices 38 necessary to support up to 16 fiber harnesses 30, each fiber harness 30 having up to 30 nodes, resulting in a system with up to 480 nodes that can cover an area being monitored of up to 5000 square meters $m^2$. However, it should be understood that the system can be reconfigured to support more or fewer nodes to cover large buildings with up to a million $m^2$ or small enclosures with 5 $m^2$. The larger coverage area enables reducing or removing fire panels, high sensitivity smoke detectors and/or control panels.

Figure 9:
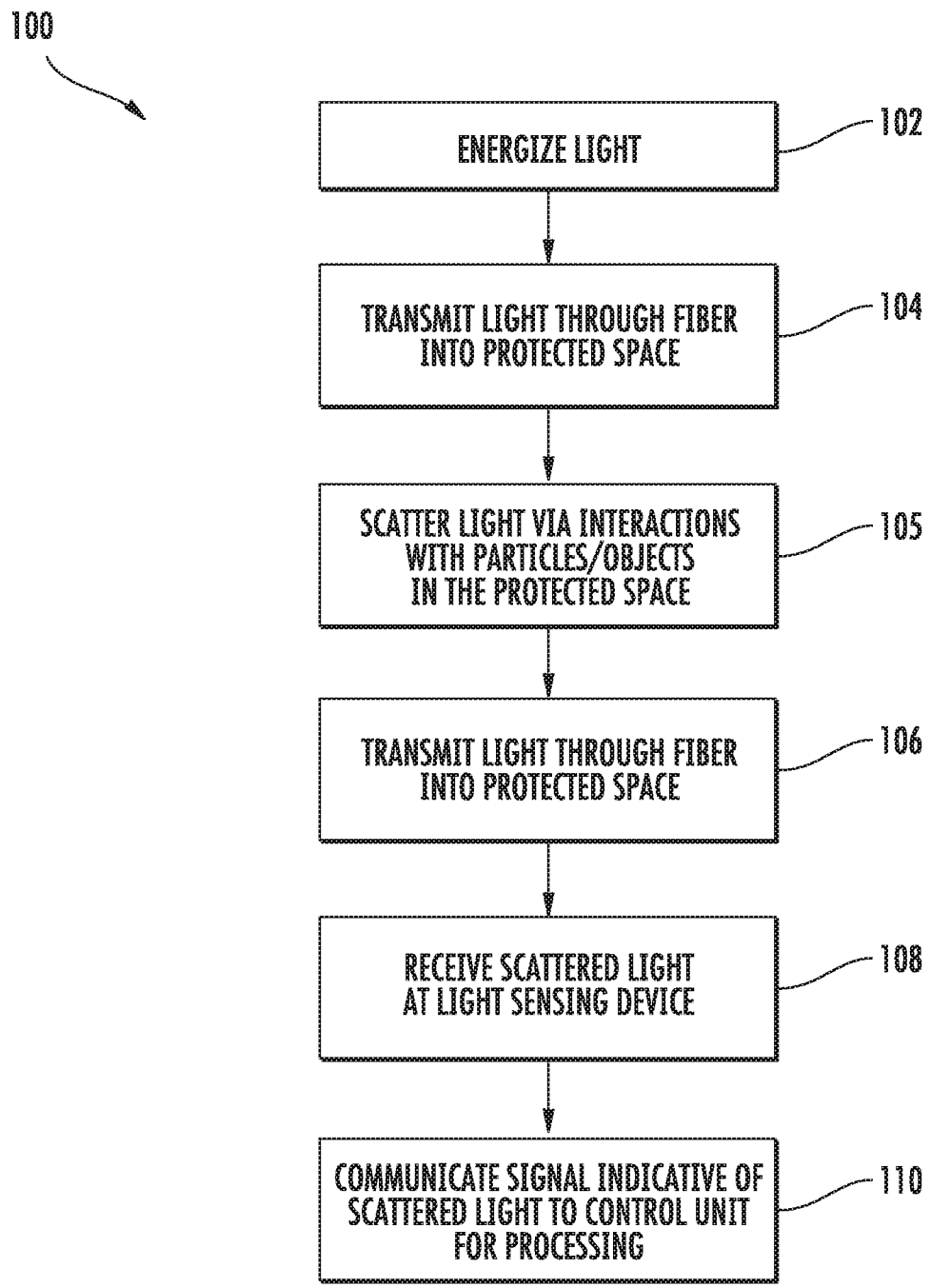
FIG. 9 is a method of operating a detection system according to an embodiment.

A method of operation 100 of the detection system 20 is illustrated in FIG. 9. The control unit 52 operably coupled to the light source 36 is configured to selectively energize the light source 36, as shown in block 102, and to emit light to a fiber harness 30 coupled thereto as shown in block 104. Based on the desired operation of the detection system 20, the control unit 52 may vary the intensity, duration, repetition, frequency, or other properties, of the light emitted. The light is transmitted through the fiber optic cable 28 and emitted at the node/nodes 34 into the protected space or area being monitored. At block 105, the light emitted into the area being monitored scatters as it interacts with particles or solid objects located within the space. In block 106, the scattered light is transmitted back through the fiber optic cable 28 via the second fiber cores 42. The scattered light may include one or more of scattered light that reflects from an interior of the fiber optic branch 32, and scattered light within the atmosphere adjacent the node 34 which is received by the node 34 and then, as already described, transmitted back through the fiber optic branches 32 via the second fiber cores 42. The scattered light is transmitted to the at least one light sensing device 38 in block 108. As shown in block 110, the light sensing device 38 generates a signal in response to the scattered light received by each node 34, and provides that signal to the control unit 52 for further processing.

Using one or more algorithms 58 executed by the processor 54, each signal representing the scattered light received by each of the corresponding nodes 34 is evaluated to determine whether the light at the node 34 is indicative of a predefined condition, such as smoke for example. With reference to FIG. 10, a schematic diagram illustrating an example of a flow path for processing the signals generated by each of the nodes 34 is illustrated. As shown, the signal indicative of scattered light 69 is parsed, shown at block 70, into a plurality of signals based on their respective originating node 34. In the illustrated, non-limiting embodiment, background signals, illustrated schematically at 72, are subtracted from the data before the pulse features are evaluated for each of the individual signals. Through integration, pulse compression, and/or feature extraction, shown at block 74, one or more characteristics or features (pulse features) of the signal may be determined. Examples of such features include, but are not limited to, a peak height, an area under a curve defined by the signal, statistical characteristics such as mean, variance, and/or higher-order moments, correlations in time, frequency, space, and/or combinations thereof, and empirical features as determined by deep learning, dictionary learning, and/or adaptive learning and the like.

In an embodiment, the time of flight record is parsed and features are extracted. The time of flight record can cover a period of time. For example, a time of flight record can record light intensity over 0.001-1,000,000 nanoseconds, 0.1-100,000 nanoseconds, or 0.1-10,000 microseconds. The features extracted from the signal can include, but are not limited to height, full width at half maximum, signal pick up time, signal drop off time, group velocity, integration, rate of change, mean, and variance for example.

Through application of the data processing, illustrated schematically at block 76, the features may then be further processed by using, for example, smoothing, Fourier transforms, or cross correlation. In an embodiment, the processed data is then sent to the detection algorithm at block 78 to determine whether or not the signal indicates the presence and/or magnitude of a condition or event at a corresponding node 34. This evaluation may be a simple binary comparison that does not identify the magnitude of deviation between the characteristic and a threshold. The evaluation may also be a comparison of a numerical function of the characteristic or characteristics to a threshold. The threshold may be determined a priori or may be determined from the signal. The determination of the threshold from the signal may include information from background learning. Background learning may be accomplished by adaptive filtering, model-based parameter estimation, statistical modeling, and the like. In some embodiments, if one of the identified features does not exceed a threshold, the remainder of the detection algorithm is not applied in order to reduce the total amount processing done during the detection algorithm. In the event that the detection algorithm indicated the presence of the condition at one or more nodes 34, an alarm or other fire suppression system may, but need not, be activated. It should be understood that the process for evaluating the data illustrated and described herein is intended as an example only and that other processes including some or all of the steps indicated in FIG. 10 are also contemplated herein.

The process for evaluating the data set forth in steps 70-78 of FIG. 10 may also advantageously employ classifiers including those that may be learned from the signal via deep learning techniques including, but not limited to deep neural networks, convolutional neural networks, recursive neural networks, dictionary learning, bag of visual/depth word techniques, Support Vector Machine (SVM), Decision Trees, Decision Forests, Fuzzy Logic, and the like. The classifiers may also be constructed using Markov Model techniques, Hidden Markov Models (HMM), Markov Decision Processes (MDP), Partially Observable MDPs, Markov Decision Logic, Probabilistic Programming, and the like.

In addition to evaluating the signals generated from each node 34 individually, the processor 54 may additionally be configured to evaluate the plurality of signals or characteristics thereof collectively, such as through a data fusion operation to produce fused signals or fused characteristics. The data fusion operation may provide information related to time and spatial evolution of an event or predetermined condition. As a result, a data fusion operation may be useful in detecting a lower level event, insufficient to initiate an alarm at any of the nodes 34 individually. For example, in the event of a slow burning fire, the light signal generated by a small amount of smoke near each of the nodes 34 individually may not be sufficient to initiate an alarm. However, when the signals from the plurality of nodes 34 are reviewed in aggregate, the increase in light returned to the light sensitive device 38 from multiple nodes 34 may indicate the occurrence of an event or the presence of an object not otherwise detected. In an embodiment, the fusion is performed by Bayesian Estimation. Alternatively, linear or non-linear joint estimation techniques may be employed such as maximum likelihood (ML), maximum a priori (MAP), non-linear least squares (NNLS), clustering techniques, support vector machines, decision trees and forests, and the like.

As illustrated and described above, the processor 54 is configured to analyze the signals generated by at least one light sensing device 38 relative to time. In another embodiment, the detection algorithm may be configured to apply one or more of a Fourier transform, Wavelet transform, space-time transform, Choi-Williams distribution, Wigner-Ville distribution and the like, to the signals to convert the signals from a temporal domain to a frequency domain. This transformation may be applied to the signals when the nodes 34 are being analyzed individually, when the nodes 34 are being analyzed collectively during a data fusion, or both.

The relationship between the light scattering and the magnitude or presence of a condition is inferred by measuring a signal's causality and dependency. As an example, the measure of a causality utilizes one or more signal features as an input and determines one or more outputs from a calculation of a hypothesis testing method, foreground ratio, second derivative, mean, or Granger Causality Test. Similarly, one or more signal features may be used as an input to evaluate the dependency of a signal. One or more outputs are selected from a calculation of a correlation, fast Fourier transform coefficients, a second derivative, or a window. The magnitude and presence of the condition is then based on the causality and dependency. The magnitude and presence of a condition may be calculated utilizing one or more evaluation approaches: a threshold, velocity, rate of change or a classifier. The detection algorithm may include utilizing the output from the calculation causality, dependency or both. This is used to indicate the presence of the condition at one or more nodes 34 and initiate a response.

When smoke is present within the ambient environment adjacent a node 34, the frequency effects of the light vary within a small range, such as from about 0.01 Hz to about 10 Hz for example. As a result, the evaluation of the frequency of the signals of scattered light may effectively and accurately determine the presence of smoke within the predetermined space 82. The detection algorithm may be configured to evaluate the signals in a fixed time window to determine the magnitude of the frequency or the strength of the motion of the smoke. Accordingly, if the magnitude of a frequency component exceeds a predetermined threshold, the algorithm 58 may initiate an alarm indicating the presence of a fire. In an embodiment, the predetermined threshold is about 10 Hz such that when the magnitude of the optical smoke frequency exceeds the threshold, a determination is made that smoke is present.

Figure 11A:
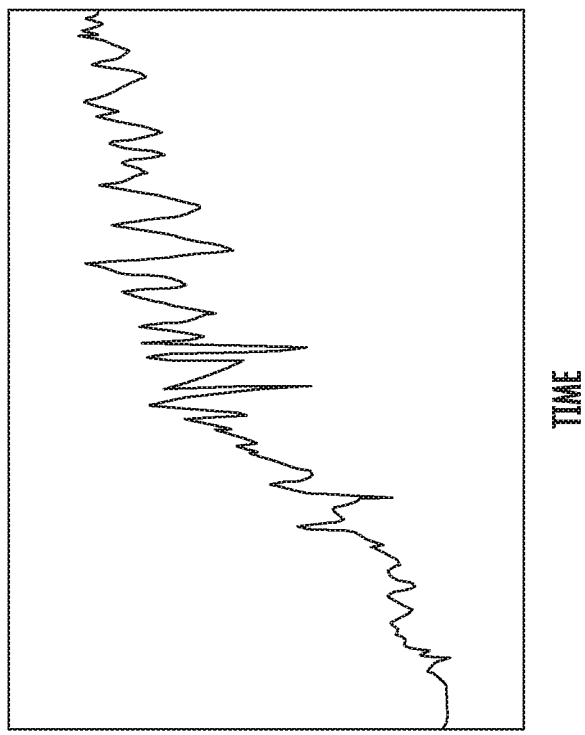
FIGS. 11A and 11B are diagrams illustrating the signals recorded by the detection system over time for various predefined conditions or events according to an embodiment.
Figure 11B:
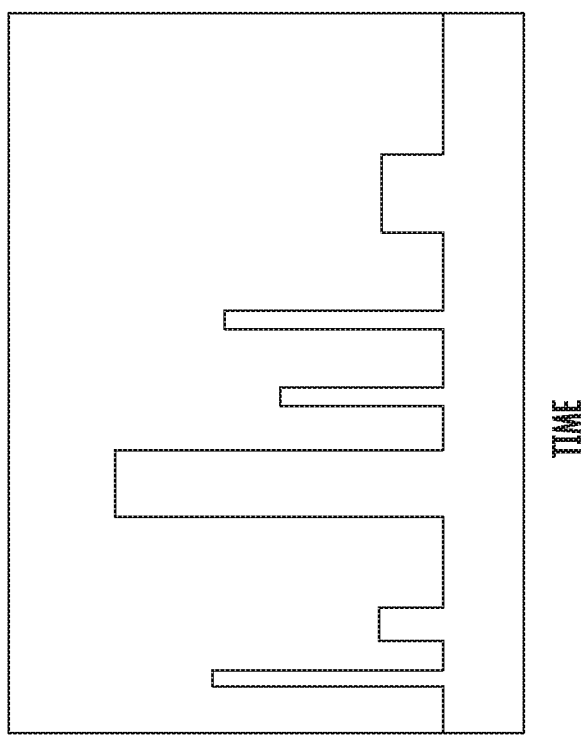

In an embodiment, the algorithm 58 is configured to distinguish between different events or conditions based on the rate of change in the light scattered by the atmosphere near the node 34 and received by one or more of the nodes 34 over time. With reference to FIGS. 11A and 11B, graphs of the signals recorded from a node 34 over time with respect to different events are illustrated. FIG. 11A indicates the change in the light signal received by a node 34 as a person walks through the area being monitored by the node 34. As shown in the graph, the movement of one or more persons through the area appears as one or more blocks or steps, each of which has an increased and constant magnitude relative to a baseline measurement. These steps indicate the temporary presence of a person and his or her proximity to the node 34. FIG. 11B, which represents the detection of smoke from a smoldering fire, appears graphically as a continuously changing signal having an accelerating increase in the change in light signal received by a node 34 over time. It should be understood that the graphs illustrated are examples only. Accordingly, each predefined event detectable by the detection system 20 has one or more unique parameters associated therewith such that the control unit 52 of the detection system 20 can distinguish between and identify multiple types of events.

To reduce the noise associated with each signal, the light emitting device 36 may be modulated such that the device 36 is selectively operated to generate modulated light in a specific pattern. In an embodiment, the light within the pattern may vary in intensity, duration, frequency, phase, and may comprise discrete pulses or may be continuous. The specific pattern of light may be designed to have desirable properties such as a specific autocorrelation with itself or cross-correlation with a second specific pattern. When the light is emitted in a specific pattern, the light scattered back to a corresponding light sensing device 38 should arrive in the substantially same pattern. Use of one or more specific and known patterns provides enhanced processing capabilities by allowing for the system 20 to reduce overall noise. This reduction in noise when combined with the signal processing may result a reduction of false positives and improved device sensitivity, e.g. with an improved signal to noise ratio the total number of false events or conditions detected will decrease, and the device sensitivity may be improved. Improvement of device sensitivity may further increase the functional limits of the detection system 20. By cross-correlating one or more second patterns, specific causes of transmitted or reflected signals may be distinguished, e.g. by Bayesian estimation of the respective cross-correlations of the received signal with the one or more second patterns.

In addition, modulation of the light signal emitted by the light source 36 may provide improved detection by determining more information about the event or condition causing the scatter in the light signal received by the node 34. For example, such modulation may allow the system 20 to more easily distinguish between a person walking through the designated area adjacent a node, as shown in FIG. 11A, and a smoldering fire adjacent the node 34.

With reference to FIG. 12, in an embodiment, one or more nodes 34 of the system 20 may include a protective cover or cover plate 120. The detector formed by the node 34 and protective cover 120 includes at least one emitting cone (not shown) associated with a core 40 coupled to a light source 36 and at least one receiving cone (not shown) associated with a core 42 coupled to a light sensing device 38. The volume where the emitting cone and the receiving cone overlap is referred to herein as a sensing volume. In embodiments including two emitting cores 40 the wavelength of the light emitted from each emitting core 40 may be different. For example, in an embodiment, a first emitting core 40 may be operable to emit an infrared light, and a second emitting core 40 may be operable to emit a visible light. However, it should be understood that a single light emitting core may also be operable to emit multiple wavelengths of light.

The protective cover 120 may be mounted adjacent the at least one node 34, such as to a surface 122 in which the node 34 is formed for example. As shown, an end surface 124 of the cover plate 120 removably couples to an adjacent mounting surface 122, such as a ceiling for example, using fasteners, adhesive, or another known connection means (not shown). The exterior of the cover plate 120 may be painted the same color as the mounting surface 122 so that the cover plate 120 blends with its surroundings in an aesthetically pleasing manner such that no apparent shadow line exists.

The cover plate 120 is generally equal to or larger in size than the node 34 so that when the cover plate 120 is connected to the mounting surface 122 adjacent the node 34, the node 34 is substantially surrounded by the cover plate 120. In the illustrated, non-limiting embodiment, the cover plate 120 is generally concave or semi-spherical in shape such that a height of the cover plate 120 is approximately half of a diameter of the cover plate 120; however, a cover plate 120 having another configuration, or alternatively, another shape are also within the scope of the disclosure. A hollow interior region or internal cavity 126 defined by the contour of the protective cover 120 is separated from an ambient region 128 located at the exterior of the protective cover 120. When the protective cover 120 is coupled to the mounting surface 122, the protected interior region 126 is typically disposed below the plane of mounting surface 122, but may be recessed or penetrate the plane of the mounting surface 122, depending on the application.

The cover plate 120 may be manufactured from plastic, metal, composite, or another suitable material. In an embodiment, the protective cover 120 is transparent to the wavelength of light emitted at the node 34. In an embodiment, the protective cover 120 can be transparent to ambient light. As used herein, the term transparent is defined to mean that the material has a transparency of at least 90% at the wavelength or wavelengths of light emitted by the one or more light emitting core 40 and/or fluoresced and/or ambient light such as room, office, or cargo bay lighting, or sunlight that may range from 300-3000 nm, transmitted through the protective cover 120. Accordingly, the emitting cone and receiving cone may transmit through the protective cover 120 to the outside region 128, and the sensing volume may additionally extend outside the cover 120. Alternatively, or in addition, the protective cover 120 may be anti-reflective such that light from one or more emitting cones is not reflected, or is reflected less than 4% within the interior region 126 of the protective cover 120. The protective cover 120 can be anti-reflective due to bulk material properties, surface properties, or a coating applied thereto.

In yet another embodiment, the protective cover 120 is absorptive to at least one of the wavelengths of light at which the detector operates. In an embodiment, the protective cover 120 can be absorptive to ambient light. The absorptive properties of the cover 120 may be achieved via a contour or coating applied to the protective cover 120. The absorption of light can also be accomplished through the absorption properties of the bulk material of the cover plates 120, and thus not require any additional coating or contouring. As used herein, the term absorptive is defined to mean that light with wavelengths corresponding to the one or more of the light sources 36, or ranges within the emission wavelength range of the light sources 36, ambient light, fluorescent light, or light within the range of the responsivity of the light sensing devices 38, such that at least 90% of the light is absorbed within the protective cover 120. Accordingly, it should be understood that various parameters of the material of the cover plate 120, such as opacity, transmissivity, and absorption for example, may affect the transmission of ambient light into or from the internal cavity 126.

In such embodiments where the cover 120 is absorptive to one or more wavelengths of light emitted at the node 34, the emitting cone(s), receiving cone(s), and therefore the sensing region(s) corresponding to the absorbed wavelengths, are limited to the interior region 126 defined by the cover 120. Accordingly, the protective cover 120 does not contribute to the back scatter returned to a receiving cone of the node 34. For example, when light is emitted from an emitting core 40 into the interior region or cavity 126 and one or more particles, illustrated at P, are present, a portion of the light scattered by the particles P will scatter back towards the receiving core 42. However, the remainder of the light will scatter in various other directions away from the node 34. This light that does not return to the node 34 will ultimately contact the cover plate 120, where it is absorbed (unless it is transmitted through apertures). In instances where light is emitted from the node 34, but a particle P is not present within the interior region 126, none or a very limited portion of the emitted light reflects back towards the node 34. Rather, the emitted light is absorbed by either the surface or the bulk material of the cover 120 to prevent saturation of the light sensing device 38 associated with the node 34.

Figure 13:
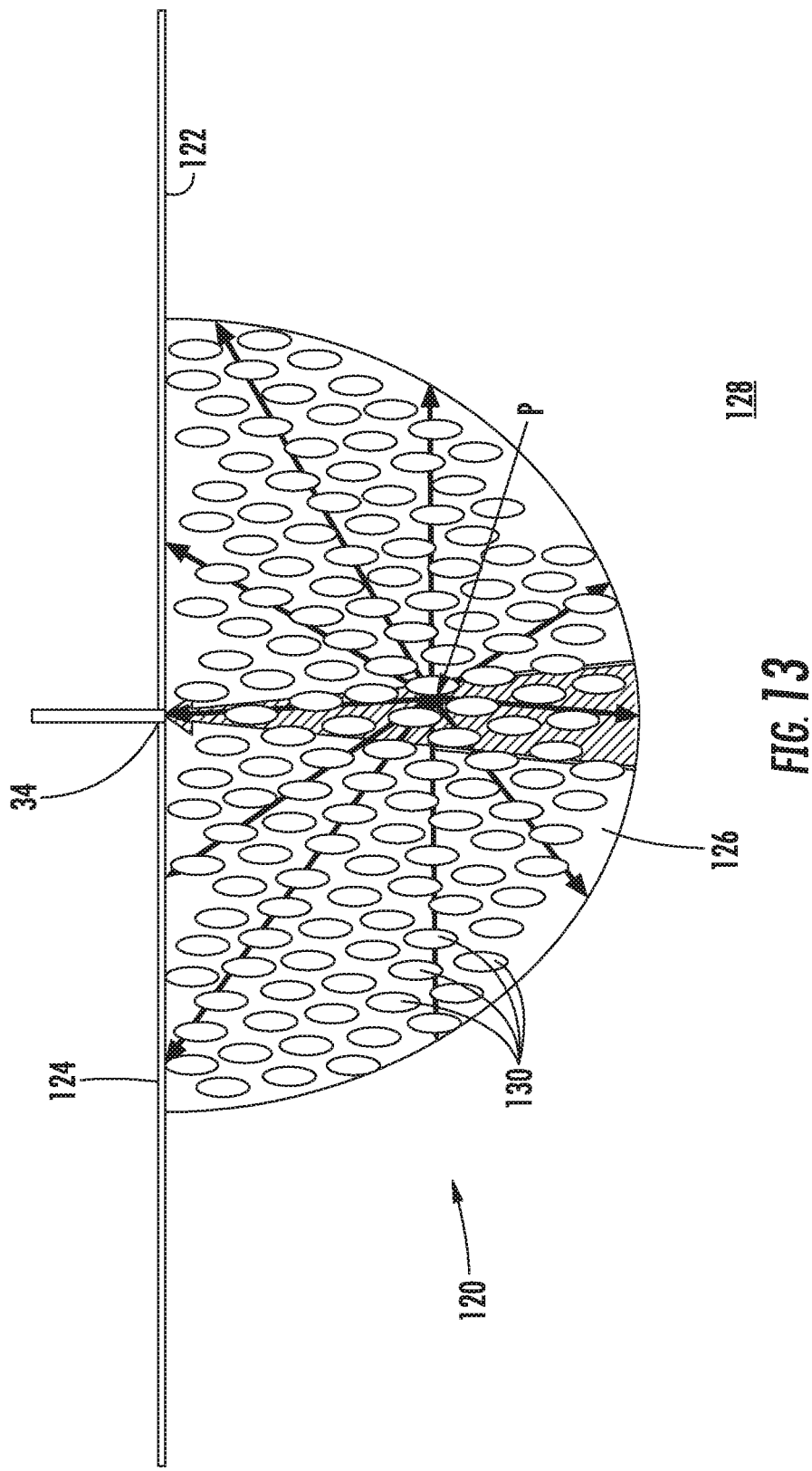
FIG. 13 is side view of a chamber surrounding a node of the detection system according to another embodiment.

Further, in an embodiment, best shown in FIG. 13, the interior and exterior regions 126, 128 defined by the protective cover 120 may be in fluid communication. As a result, particles P located within the exterior region 128, may be communicated to the interior region 126. In an embodiment, the cover plate 120 includes a plurality of small openings or perforations 130 that allow light, heat, and/or particles from the ambient atmosphere 128 exterior to the cover 120 to transfer into the interior region 126. However, the overall size of the perforations may be selected to provide at least a partial barrier between the interior 126 and the exterior 128 of the cover 120. For example, the perforations may be sized to restrict the amount of ambient light transmitted from the ambient atmosphere to the interior region 126. Alternatively, or in addition, the cover plate 120 may be configured to block the view of solid objects relative to the node 34, as well as protect the node 34 from damage. Solid objects may include any objects, components, or bodies located within the area being monitored, external to the cover plate 140, such as fixtures within a room or people passing through the area for example.

By having a protective cover 120 that is absorptive for both ambient light as well as wavelengths of light emitted by the node 34, the light emitted from the node 34 will be restricted to an interior region 126 defined by an adjacent cover 120, and the amount of ambient light within the interior 126 and the view of solid objects is restricted, thereby reducing the likelihood of false alarms. In addition, the cover 120 protects the node 34 from damage, tampering, and vandalism.

Further, by positioning a cover 120 to restrict the light that is emitted into the surrounding environment by the node 34, the intensity of the light emitted from the node 34 may be increased to levels that would not otherwise be safe. This increase in the light intensity can enhance the sensitivity of the detection being performed while reducing the total number of false alarms of the system 20.

While the disclosure has been described in detail in connection with only a limited number of embodiments, it should be readily understood that the disclosure is not limited to such disclosed embodiments. Rather, the invention can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A detection system for measuring one or more conditions within a predetermined area comprising:
at least one fiber optic cable including at least one optic core for transmitting light to and receiving scattered light from one or more nodes, the one or more nodes being formed in a mounting surface, the light being emitted from the one or more nodes via at least one emitter cone and the scattered light being received by the one or more nodes via at least one receiver cone;
a cover plate having an internal cavity and an end surface, the end surface being affixed to the mounting surface and surrounding the one or more nodes such that the one or more nodes are in communication with the internal cavity, wherein a sensing volume where the at least one emitter cone and the at least one receiver cone extends outside of the cover plate; and
a control system operably coupled to the at least one fiber optic cable so that the scattered light received by the one or more nodes is transmitted to the control system, wherein the control system analyzes the scattered light to evaluate a condition at the one or more nodes.

2. The detection system of claim 1, wherein the cover plate is generally concave in shape.

3. The detection system of claim 1, wherein the one or more nodes includes a plurality of nodes, and each of the plurality of nodes is surrounded by the cover plate.

4. The detection system of claim 1, wherein the one or more nodes includes a plurality of nodes and at least one of the plurality of nodes is not surrounded by the cover plate.

5. The detection system of claim 1, wherein the cover plate is removably mounted adjacent the one or more nodes.

6. The detection system of claim 1, wherein a diameter of the cover plate is greater than the one or more nodes.

7. The detection system of claim 1, wherein the cover plate includes a plurality of perforations.

8. The detection system of claim 7, wherein the plurality of perforations are sized to allow particles from an atmosphere exterior to the cover plate to transfer into the internal cavity.

9. The detection system of claim 8, wherein the plurality of perforations are sized to form a partial barrier between the internal cavity and the atmosphere exterior to the cover plate.

10. The detection system of claim 1, wherein the cover plate limits a transmission of ambient light into the internal cavity.

11. The detection system of claim 1, wherein the cover plate absorbs one or more wavelengths of light emitted by the one or more nodes.

12. The detection system of claim 1, wherein the cover plate is anti-reflective at one or more wavelengths of light emitted by the one or more nodes.

13. The detection system of claim 1, wherein the cover plate is transparent to one or more wavelengths of light emitted by the one or more nodes.

14. The detection system of claim 1, wherein the cover plate is configured to restrict a transfer of solid objects into the internal cavity.

15. A method of measuring a condition comprising:
   transmitting light from one or more nodes of a fiber optic cable into an internal cavity defined by a cover plate surrounding the one or more nodes, the one or more nodes being formed at a mounting surface and an end surface of the cover plate being connected to the mounting surface;
   the light being emitted from the one or more nodes via at least one emitter cone and scattered light being received by the one or more nodes via at least one receiver cone
   scattering the light within the internal cavity;
   receiving a portion of the scattered light from the internal cavity via the at least one receiver cone, wherein a sensing volume where the at least one emitter cone overlaps the at least one receiving cone extends outside of the cover plate;
   communicating the scattered light to a control system; and
   analyzing the scattered light to evaluate a condition within the internal cavity adjacent the node.

16. The method of claim 15, further comprising absorbing another portion of the scattered light at the cover plate.

* * * * *